United States Patent Office 3,370,037
Patented Feb. 20, 1968

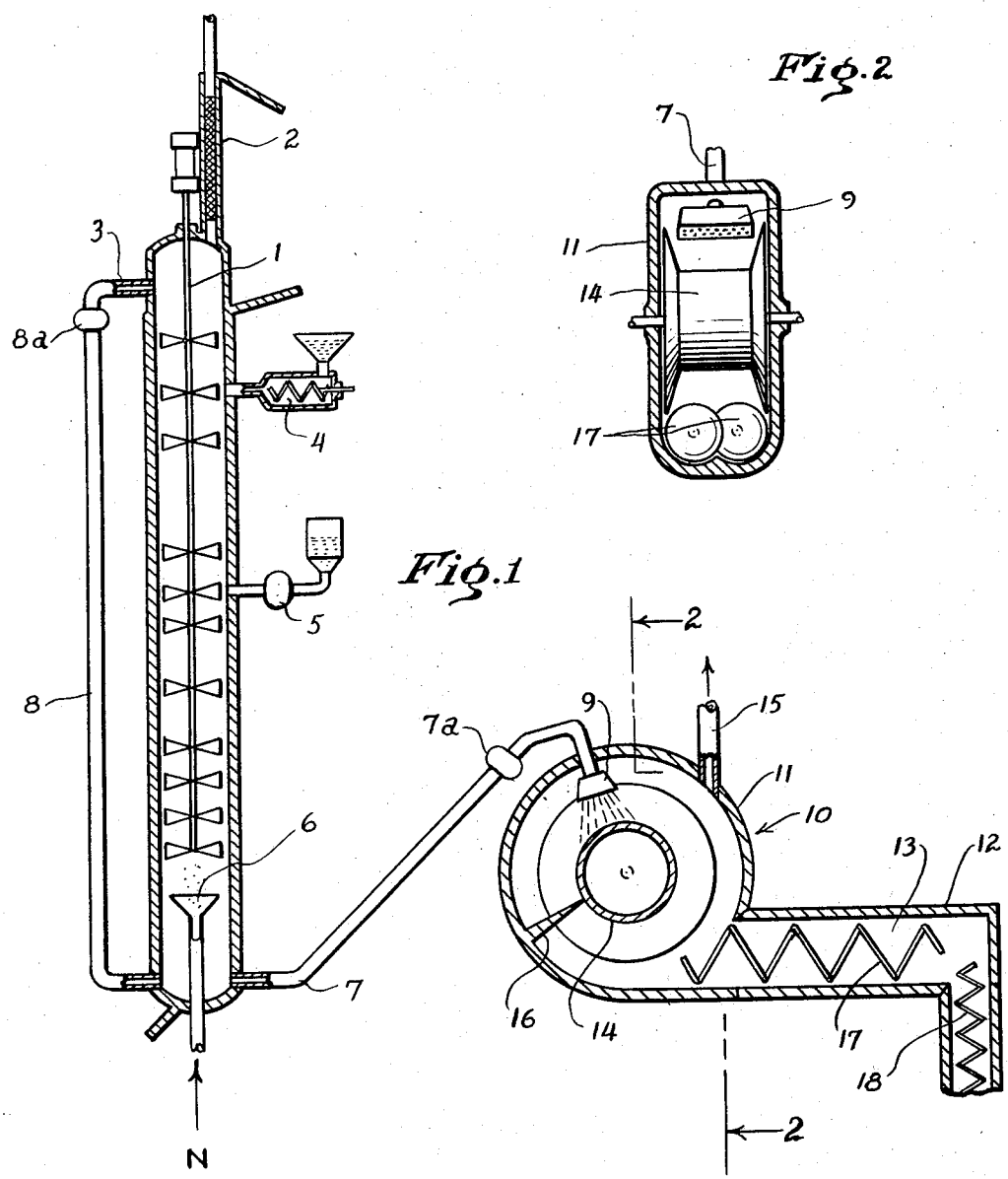

3,370,037
PROCESS FOR THE CONTINUOUS MANU-
FACTURE OF COPOLYETHERESTERS
Johann Giesen, Haldenstein, Grisons, and Wolfgang
Griehl and Hans Lückert, Chur, Grisons, Switzer-
land, assignors to Inventa A.G. für Forschung und
Patentverfung, Zurich, Switzerland
Filed Feb. 4, 1964, Ser. No. 342,350
Claims priority, application Switzerland, Feb. 6, 1963,
1,451/63
7 Claims. (Cl. 260—47)

ABSTRACT OF THE DISCLOSURE

A process for the manufacture of copolyetheresters from terephthalic acid, aromatic oxycarboxylic acids and glycols. Terephthalic acid is reacted with an oligomer mixture, preformed from terephthalic acid, glycols and aromatic oxycarboxylic acids while splitting off water, forming a mixture of oligomeric products containing carboxyl groups in terminal position, followed by reconverting the latter to oligomer mixtures with glycols with glycol esters of the oxycarboxylic acids or their ethers, and polycondensation of a portion thereof.

The invention relates to a continuous process for the manufacture of copolyetheresters. More particularly, it relates to such a process using as starting materials terephthalic acid, glycols and aromatic oxycarboxylic acids, wherein the reaction takes place in an extremely short time while avoiding the formation of undesirable diglycolethers.

In our U.S. Patents 3,056,761, issued Oct. 12, 1962, and 3,288,755, issued Nov. 29, 1966, we have described processes relating to the manufacture of copolyetheresters from oxybenzoic acid or vanillic acid, respectively, terephthalic acid, and ethylene glycol.

It has also been proposed to produce these copolyetheresters not from the preformed ethers of the aromatic oxycarboxylic acids, but to allow the ether linkages to form during the precondensation and polycondensation. The polycondensates thus formed are suitable for fabrication into films, foils, fibres, ribbons and the like of excellent properties. For instance, they can be dyed and remain light- and rub-resistant, and foils and films can be made of practically any desired thickness.

The object of the present invention is a continuous process for the manufacture of these copolyetheresters.

According to the patents named above, free terephthalic acid first is heated together with ethylene glycol and p-oxybenzoic acid or with fully or partially glycoletherified p-oxybenzoic acid. A polycondensable precondensate is formed thereby while esterification and eventually etherification occurs. The reaction, however, requires a long period of time primarily because of the lack of lower solubility of the terephthalic acid. While the reaction time can be shortened by working at higher temperatures, this leads to additional difficulties, especially with regard to the equipment because, in this case, the reaction must be carried out under pressure. Swiss Patent 334,308 proposes to shorten the long time required for the reaction of the terephthalic acid with ethylene glycol by adding, at the start, a little diglycolterephthalate. Even then, the reaction still takes at least 5 hours, and in this process and also in the process mentioned above, which must be carried out under pressure, the formation of considerable quantities of undesirable diglycolethers cannot be avoided. The latter, as is well known, lower the melting point and decrease the light resistance of the end products.

It now has been found that the copolyetheresters can be produced continuously or semi-continuously at extremely short reaction times and while avoiding the formation of undesirable diglycolethers, by the following method:

Preformed oligomeric etherester mixture first is reacted with terephthalic acid, and the reaction mixture thus obtained, which contains carboxyl groups in terminal position, then is reacted with fully or partially glycoletherified aromatic oxycarboxylic acid and glycol or with its glycol ester and glycol or with a mixture thereof with glycol.

The reaction of the terephthalic acid, as well as that of the reaction partners added subsequently, occurs, while splitting off water, practically instantaneously provided the temperature is held at preferably 220° C. or above. The esterification reaction, as well as the etherification of free phenolic hydroxyl groups possibly present is accelerated by addition of catalysts. Particularly suitable catalysts are sulfonic acids and compounds of elements which react amphoterically, such as boron, beryllium, aluminum, zinc, lead, tin, iron, titanium, arsenic, antimony, cobalt, manganese, etc. In order to avoid discoloration of the end product which may occur by overheating and side reactions, for instance by prolonged contact with the walls of the reactor, an addition of a stabilizer consisting of organic or inorganic compounds of tri- or penta-valent phosphorus is recommended. Suitable compounds are acids of phosphorus, metal phosphates and phosphites, alkyl- and aryl-phosphates and phosphites.

The oxycarboxylic acids used in the process especially are p-oxybenzoic acid and its derivatives, and its substituted products such as vanillic acid, chloro- and methyl-p-oxybenzoic acid. It is obvious that it is not necessary to use merely terephthalic acid and ethylene glycol, but that they may be replaced in part by their isomers or a homolog.

The object of the invention therefore is a process for the manufacture of copolyetheresters from terephthalic acid, glycols and aromatic oxycarboxylic acids which is characterized by reacting terephthalic acid with an oligomer mixture, preformed from terephthalic acid, glycols and aromatic oxycarboxylic acids while splitting off water and forming a mixture of oligomeric products containing carboxyl groups in terminal position, followed by reconverting the latter to the original oligomer mixture with glycols and glycolesters of the aromatic oxycarboxylic acids, or their ethers respectively, and finally poly-condensing a portion thereof continuously. The reaction just described can be carried out in an agitator provided with a fractionating column for the distillation of the water formed, and polycondensing a portion of the products thus obtained while the remainder is held for the next following charge.

However, it is opportune to use a vertical tube also provided with a fractionating column and an effective agitator, into which a stream of finely divided inert gas or vapor is entered from below. The reaction product moves downward from the top and, in part, is recycled into the top of the tube after leaving the same at the bottom. The other part continuously traverses a device wherein it is held under conditions which permit as fully as possible an elimination of all volatile reaction products and reactants. A high vacuum, high temperatures and as fine as possible a layer of materials, under good revolution is preferred.

A suitable device for carrying out the process according to the invention will now be described with reference to the accompanying drawings.

In the drawings:

FIG. 1 shows an agitator tube with fractionating column, as a front elevation, partly in section, and connected thereto a reactor vessel, in side elevation, also partly in section.

FIG. 2 is a section taken along lines 2—2 of FIG. 1.

In a preferred embodiment, illustrated with reference to the accompanying drawing, a vertical tube of 3 m. length is provided with an agitator shaft 1 carrying a plurality of blades; a fractionating column 2 on top for distilling off the water formed during the reaction; a product inlet 3; and a metering conveyor 4 for entering terephthalic acid; a metering device 5 for the glycol and other liquids, substantially at the center of the reactor tube; an inert gas inlet 6; an outlet 7; and a recycling line 8; 6, 7 and 8 being disposed at the bottom of the tube. Into the top of this tube, an oligomer mixture is conducted, consisting of 80 parts by weight ethyleneglycol-di-terephthalic acid monoglycolester having the Formula 1

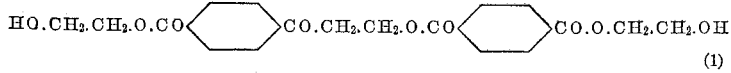

(1)

and 20 parts by weight 1,4-β-oxyethoxybenzoic acid glycolester, and the mixture is caused to flow downward through the tube at such a speed that it has an average dwelling time of 2 hours therein. Simultaneously, strong agitation is provided by agitator 1. Just below the liquid level of the mixture, 16 parts, per 100 parts oligomer mixture, of terephthalic acid, 0.005 part antimony acetate and 0.005 part manganese acetate, are entered per hour. Approximately at half the height of the tube, a preheated mixture of 9 parts ethylene glycol, 5.38 parts β-oxyethoxybenzoic acid glycol ester and 0.01 part triphenylphosphite are added by means of a metering pump (not shown). All parts named above are parts by weight. The reaction temperature is held during the process described above at substantially 260° C., and the water formed is distilled continuously through the column 2, aided by the inert gas. At the bottom of the tube so much of the oligomer mixture is withdrawn and reentered through line 8 and pump 5a into the top of the tube, as is required to keep a constant level in the tube. The remainder of the oligomer mixture continuously traverses line 7 to a jet 9 through which, by means of pump 7a, it is conducted into reactor 10. The latter is a housing provided with heating jacket 11 to which is connected a reaction tube 13, also provided with a heating jacket 12. Within reactor 10 a hollow cylinder 14 slowly rotates through which a heating medium flows. The reaction mixture is sprayed by jet 9 in a thin layer onto the hollow cylinder 14. Reactor 10 is under a vacuum of less than 1 mm. Hg, and the volatile reaction products thus withdrawn from the thin layer leave the system by the suction pipe 15 which leads to the vacuum pump (not shown). The product sprayed on cylinder 14, due to the latter's rotation, meets a scraper 16 and, by this time being viscous, slowly flows through reaction tube 13. Therein an automatically stripping dual conveyor provides for the flow of the reaction product to the outlet conveyor 18 while, on the way to conveyor 18, other portions of the product again are exposed to the vacuum in a thin layer.

The polycondensate leaving conveyor 18 has a melting point of 230° C., is practically free of diglycolether and has a relative solution viscosity of 1.40, measured as a 0.5 percent solution of m-cresol at 200° C.

Like results are obtained when, in lieu of the catalysts and stabilizer named above, any one of those previously named are used.

Furthermore, in lieu of ethylene glycol, any glycol is applicable and yields equally good results, which has the Formula 2

wherein $x$ is a whole number from 2 to 10.

Finally, instead of p-oxybenzoic acid, vanillic acid, chloro- and methyl-p-oxybenzoic acids give the same results.

We claim as our invention:

1. A process for the continuous manufacture of copolyetheresters from terephthalic acid, glycols and aromatic oxycarboxylic acids, which comprises reacting an oligomer mixture, formed from terephthalic acid, glycols having the formula $HO(CH_2)_nOH$, wherein $n$ is a whole number from 2 to 10, and aromatic oxycarboxylic acids, with terephthalic acid, while splitting off water and forming a mixture of oligomer products containing carboxylic groups in terminal position; reconverting by alcoholysis said oligomer products with a mixture consisting of glycol and glycol esters of said oxycarboxylic acids into an oligomer mixture of the same nature as originally present; withdrawing said oligomer mixture and recycling a portion thereof into the process; and continuously polycondensing the remainder of said oligomer mixture.

2. A process for the continuous manufacture of copolyetheresters from terephthalic acid, glycols having the formula $HO(CH_2)_nOH$, wherein $n$ is a whole number from 2 to 10, and aromatic oxycarboxylic acids, which comprises reacting an oligomer mixture, formed from terephthalic acid, and hydroxyalkoxycarboxylic acids with terephthalic acid while splitting off water and forming a mixture of oligomer products containing carboxylic groups in terminal position; reconverting said oligomer products by alcoholysis with a mixture consisting of glycol and glycolester of said hydroxyalkoxycarboxylic acids into an oligomer mixture of the same nature as originally present and recycling a portion thereof into the process; and continuously polycondensing the remainder of said oligomer mixture.

3. A process for the continuous manufacture of copolyetheresters from terephthalic acid, glycols and aromatic oxycarboxylic acids, which comprises reacting an oligomer mixture, formed of terephthalic acid, a glycol having the formula $HO(CH_2)_nOH$, wherein $n$ is a whole number from 2 to 10, and an oxycarboxylic acid selected from the group consisting of p-oxybenzoic acid, methyl-p-oxybenzoic acid, chloro-p-oxybenzoic acid, and vanillic acid, with terephthalic acid while splitting off water and forming the corresponding oligomeric dicarboxylic acids; reconverting said dicarboxylic acids into an oligomer mixture of the same nature as originally present by alcoholysis with a compound selected from the group consisting of said glycols, esters thereof with said oxycarboxylic acids, and mixtures thereof; withdrawing said oligomer mixture and recycling a portion into the process in order to maintain a constant liquid level; and continuously polycondensing the remainder of said oligomer mixture.

4. A process for the continuous manufacture of copolyetheresters from terephthalic acid, glycols and aromatic oxycarboxylic acids, which comprises reacting an oligomer mixture, formed of terephthalic acid, a glycol having the formula $HO(CH_2)_nOH$, wherein $n$ is a whole number from 2 to 10, and an oxycarboxylic acid selected from the group consisting of p-oxybenzoic acid, chloro-p-oxybenzoic acid, methyl-p-oxybenzoic acid, and vanillic acid, for approximately 2 hours at a temperature of substantially 220–260° C. and at atmospheric pressure, with terephthalic acid while splitting off water and forming the corresponding oligomeric dicarboxylic acids; reconverting said dicarboxylic acids into an oligomer mixture of the same nature as originally present by alcoholysis with a compound selected from the group consisting of said glycols, esters thereof with said oxycarboxylic acids, and mixtures thereof; withdrawing said oligomer mixture and recycling so much into the process as is required to maintain a constant liquid level; and polycondensing the remainder of said oligomer mixture in a thin layer and at a vacuum of no more than 1 mm. Hg.

5. A process for the continuous manufacture of copolyetheresters from terephthalic acid, glycols and aromatic oxycarboxylic acids, which comprises reacting an oligomer mixture, formed of terephthalic acid, a glycol having the formula $HO(CH_2)_nOH$, wherein $n$ is a whole number from 2 to 10, and an oxycarboxylic acid selected from the group consisting of p-oxybenzoic acid, chloro-p-oxybenzoic acid, methyl-p-oxybenzoic acid, and vanillic acid, for approximately 2 hours at a temperature of substantially 220–260° C. and at atmospheric pressure, with 16 parts terephthalic acid per 100 parts oligomer mixture, in the presence of 0.001 part of a catalyst selected from the group consisting of sulfonic acids, and salts of an amphoteric element; thereby splitting off water and forming the corresponding oligomeric dicarboxylic acids; reconverting said dicarboxylic acids by alcoholysis with substantially 15 parts, calculated on the reaction mixture, of a compound selected from the group consisting of said glycols, esters thereof with said oxycarboxylic acids, and mixtures thereof, in the presence of substantially 0.01 part of a stabilizer selected from the group consisting of acids of phosphorus, metal phosphates and phosphites, alkyl- and aryl-phosphates and phosphites; withdrawing said oligomer mixture and recycling so much into the process as is required to maintain a constant liquid level; and polycondensing the remainder of said oligomer mixture in a thin layer and at a vacuum of no more than 1 mm. Hg.

6. A process for the continuous manufacture of copolyetheresters from terephthalic acid, aromatic oxycarboxylic acids and glycols having the formula $HO(CH_2)_nOH$, wherein $n$ is a whole number from 2 to 10, which comprises catalytically condensing an oligomer mixture, which had been produced from substantially 80 weight parts glycolditerephthalic acid monoglycol ester and 20 weight parts of glycol ester of an acid selected from the group consisting of p-oxybenzoic acid, chloro-p-oxybenzoic acid, methyl-p-oxybenzoic acid, and vanillic acid, with 16 parts terephthalic acid per 100 parts oligomer mixture at substantially 220–260° C.; reconverting the oligomer mixture thus obtained by alcoholysis with glycol and glycol ester of said acids in the presence of a compound selected from the group consisting of acids of phosphorus, metal phosphates and phosphites, alkyl- and aryl-phosphates and phosphites, at like temperatures, to an oligomer of the same nature as originally present; and continuously polycondensing a portion thereof.

7. A process for the continuous manufacture of copolyetheresters from terephthalic acid, aromatic oxycarboxylic acids and glycols having the formula $HO(CH_2)_nOH$, wherein $n$ is a whole number from 2 to 10, which comprises catalytically condensing an oligomer mixture, which had been produced from substantially 20 weight parts 1,4-beta-oxyethoxybenzoic acid glycol ester and 80 weight parts glycolditerephthalic acid monoglycol ester, at substantially 260° C.; reconverting 100 weight parts of the oligomer mixture thus obtained by alcoholysis with substantially 5.38 weight parts beta-oxyethoxybenzoic acid glycol ester and 9 parts glycol in the presence of triphenyl phosphite, at substantially 260° C., to an oligomer mixture of the same nature as originally present; and continuously polycondensing a portion thereof.

References Cited
UNITED STATES PATENTS

| | | | |
|---|---|---|---|
| 3,056,761 | 10/1962 | Griehl et al. | 260—47 |
| 3,288,755 | 11/1966 | Griehl et al. | 260—47 |

WILLIAM H. SHORT, *Primary Examiner.*

LOUISE P. QUAST, *Examiner.*